United States Patent
Yang

(10) Patent No.: US 7,140,743 B2
(45) Date of Patent: Nov. 28, 2006

(54) DIRECT BACKLIGHT MODULE

(76) Inventor: Pang-Lun Yang, 3F-2, No.2, Lane 71, Szu Wei Road, Wu Chi Chen, Taichung Hsien (TW)

( * ) Notice: Subject to any disclaimer, the term of this patent is extended or adjusted under 35 U.S.C. 154(b) by 103 days.

(21) Appl. No.: 10/747,379

(22) Filed: Dec. 29, 2003
(Under 37 CFR 1.47)

(65) Prior Publication Data
US 2004/0141301 A1    Jul. 22, 2004

(30) Foreign Application Priority Data
Dec. 27, 2002   (TW) .............................. 91137716 A

(51) Int. Cl.
*G01D 11/28* (2006.01)
(52) U.S. Cl. .......................... 362/29; 362/26; 362/27; 362/600
(58) Field of Classification Search ................ 362/29, 362/26, 27, 31, 600; 349/58, 62, 63; 385/146
See application file for complete search history.

(56) References Cited

U.S. PATENT DOCUMENTS 5,128,783 A * 7/1992 Abileah et al. ............. 349/162
5,386,347 A * 1/1995 Matsumoto ................. 362/31
6,577,361 B1 * 6/2003 Sekiguchi et al. ........... 349/96

FOREIGN PATENT DOCUMENTS

| JP | 7-716794 | 7/1995 |
| JP | 2001-22285 | 1/2001 |

OTHER PUBLICATIONS

Patent Abstracts of Japan of JP 2001-22285 dated Jan. 26, 2001.
Patent Abstracts of Japan of JP 7-176794 dated Jul. 14, 1995.

* cited by examiner

*Primary Examiner*—Sandra O'Shea
*Assistant Examiner*—Mark Tsidulko
(74) *Attorney, Agent, or Firm*—Ladas & Parry LLP

(57) ABSTRACT

A direct backlight module has a light guide plate, a plurality of lamp tubes, a reflecting plate and a frame. The light guide plate has a upper surface and a lower surface, and at least one surface of the light guide plate is coated with an ink layer. The lamp tubes are located below the light guide plate. The reflection plate is located below the lamp tubes. The frame covers the reflecting plate, lamp tubes and light guide plate. The ink layer contains a plurality of diffusing granules for diffusing lights to produce uniform lights.

16 Claims, 4 Drawing Sheets

DIRECT BACKLIGHT MODULE

FIELD OF THE INVENTION

The present invention relates to a backlight module for liquid crystal displays (LCDs) and particularly to a direct backlight module with an ink layer.

BACKGROUND OF THE INVENTION

With rapid advance of manufacturing technologies in thin film transistor LCD (TFT-LCD), and the advantages of slim and light, power saving and low radiation, LCDs have been widely used in various types of electronic products such as personal digital assistant (PDA), notebook computers, digital cameras, video cameras, mobile phones, and the like. In addition, the industry has invested heavily in research and development and uses mass production facilities. As a result, quality of LCD continuously improves and the price drops relentlessly, application scope of LCD is expanded drastically. However LCD cannot generate light by itself. It requires a backlight module to accomplish a display function.

FIG. 1 is a cross-sectional view of a conventional edge type backlight module 10. The module 10 includes a light guide plate 11, a reflecting plate 12, a lamp tube 13, a plurality of optical films 14 and a frame 15. The light guide plate 11 is made from a transparent acrylic plate which has a lower surface forming circular, hexagonal or square granular patterns by a screen printing or injection method to serve as diffusion dots 16 for scattering light. The reflecting plate 12 is located below the light guide plate 11 to reflect light emitted from the lamp tube 13 into the light guide plate 11 and to increase the utilization efficiency of the backlight module 10. The lamp tube 13 is located on one lateral side of the light guide plate 11 and is usually a cold cathode tube for projecting light into the light guide plate 11 from one end thereof. The optical films 14 are located above the light guide plate 11 and include a diffuser plate, prism sheet and polarizing sheet and the like. The frame 15 is for holding the reflecting plate 12, lamp tube 13, and light guide plate 11 and protects the backlight module 11 and the elements contained therein.

In the edge type backlight module depicted above, light emitted from the lamp tube enters the light guide plate from one end thereof and reaches the other end thereof to generate uniform lights. However, the size of the light guide plate increases with the dimension of LCD becomes larger. Light of the edge type backlight module cannot fully transmit from one end of the light guide plate to the other end due to a long path. As a result, bright variations occur from the end close to the lamp tube to the other end away from the lamp tube. Therefore, the LCD cannot generate uniform brightness.

Refer to FIG. 2 for a direct type backlight module 20. The module 20 includes a diffuser plate 21, a plurality of lamp tubes 22, a reflecting plate 23, a frame 24 and a plurality of optical films 25. The diffuser plate 21 is a white transparent acrylic plate. The diffuser plate 21 has a lower surface, a upper surface, and a plurality of diffusion dots located therein (not shown in the drawing) for diffusing lights. The lamp tubes 22 are located below the diffuser plate 21. The reflecting plate 23 is located under the lamp tubes 22. A portion of light emitted from the lamp tubes 22 directly enters the diffuser plate 21, while the rest portion of the light is reflected by the reflecting plate 23 and then enters the diffuser plate 21. The frame 24 covers the diffuser plate 21, lamp tubes 22 and reflecting plate 23 so as to protect the elements located in the backlight module 20. The optical films 25 are the same as the conventional ones depicted before, thus the details are omitted.

In the aforesaid direct backlight module 20, several lamp tubes 22 are uniformly located below the diffuser plate 21, the diffuser plate 21 may transmit uniform lights theoretically. However, due to the thickness of the diffuser plate 21, usually 2 to 4 mm, the light path is very short for lights passing through the diffuser plate 21, and lights are very difficult to be evenly diffused. As a result, some areas of the diffuser plate 21 transmit stronger scattering light beams while some other areas do not. This causes uneven brightness of the backlight module 20 as shown in FIG. 3, and a significant variation of brightness occurs on the LCD screen as shown in FIG. 4. It serious affects visual satisfactions of consumers. To remedy this problem, another conventional technique was developed. Several diffuser sheets are used to diffuse lights and obtain a more uniform light output for the backlight module. However, the improvement is limited, and each diffuser sheet has a high shielding ratio that result in a great impact to the brightness of the backlight module.

Therefore to overcome the disadvantages occurred to the conventional direct backlight modules and to develop improvement to achieve more uniform lighting to enhance the visual appealing of LCD is a goal hotly pursed in the industry at present.

SUMMARY OF THE INVENTION

The primary object of the invention is to provide a direct backlight module to generate more uniform lights.

The direct backlight module according to the invention includes a light guide plate, a plurality of lamp tubes, a reflecting plate, a frame and a plurality of optical films. The light guide plate is made from transparent acrylic. The light guide plate has an upper surface and a lower surface. At least one of the surfaces is coated with an ink layer by a screen-printing process. The ink layer is a white fluorescent layer containing a plurality of diffusion granules and a transparent resin. The lamp tubes are distributed below the light guide plate. The reflecting plate is located below the lamp tubes to reflect light. The frame covers the reflecting plate, the lamp tubes, and the light guide plate so as to protect the elements in the backlight module from being damaged by external forces.

When both the upper and lower surfaces of the light guide plate are coated with an ink layer, lights emitted from the lamp tubes, whether directly entering the light guide plate or reflecting by the reflecting plate, will be diffused for the first time by the ink layer on the lower surface, then diffused for the second time by the ink layer on the upper surface. The resin in each ink layers can absorb the incident lights and retain the lights in the resin temporarily before emitting. The diffusion granules can diffuse the incident lights, thus the incident lights are diffused twice by the two ink layers and become more uniform lights when transmitting out of the light guide plate. Therefore, variations of brightness of the LCD screen can be reduced to enhance the visual appealing.

The foregoing, as well as additional objects, features and advantages of the invention will be more readily apparent from the following detailed description, which proceeds with reference to the accompanying drawings.

DESCRIPTION OF THE PREFERRED EMBODIMENTS

The invention discloses a direct backlight module with an ink layer on upper and lower surfaces of a light guide plate to increase the uniformity of output lights of the backlight module and enhance visual appealing of LCD. Preferred embodiments of the invention are elaborated as follows.

Figure 1:
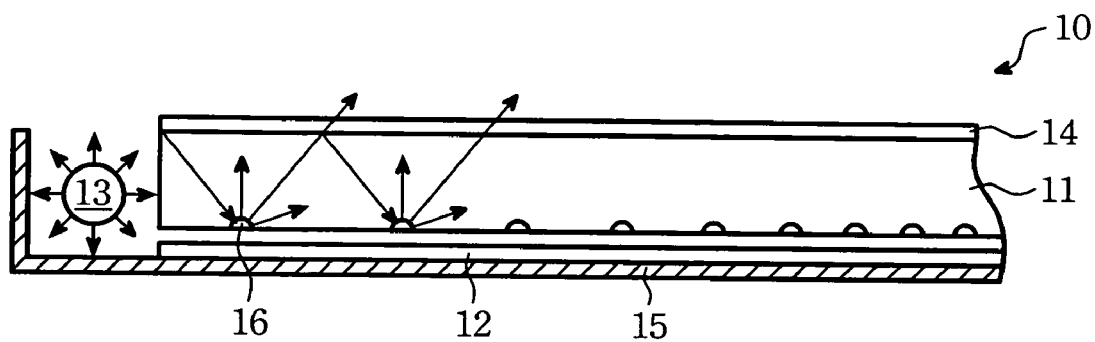
FIG. 1 is a sectional view of a conventional edge light backlight module.
Figure 2:
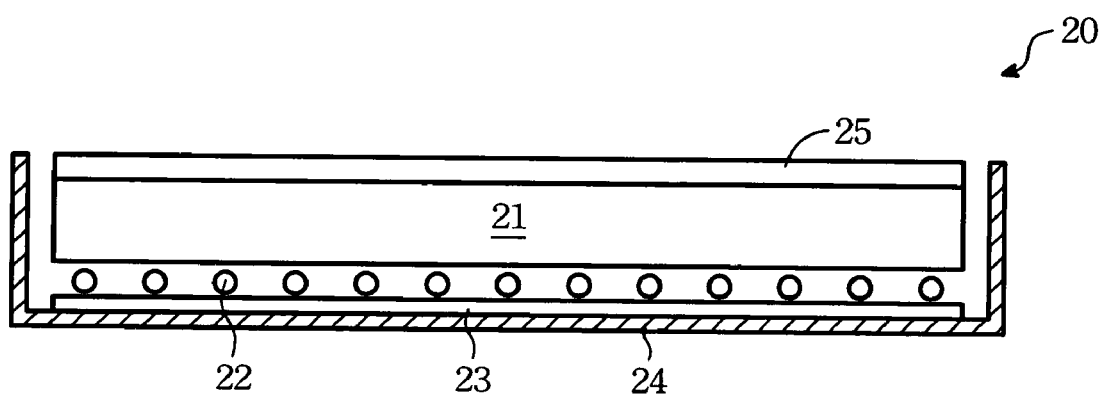
FIG. 2 is a sectional view of a conventional direct backlight module.
Figure 3:
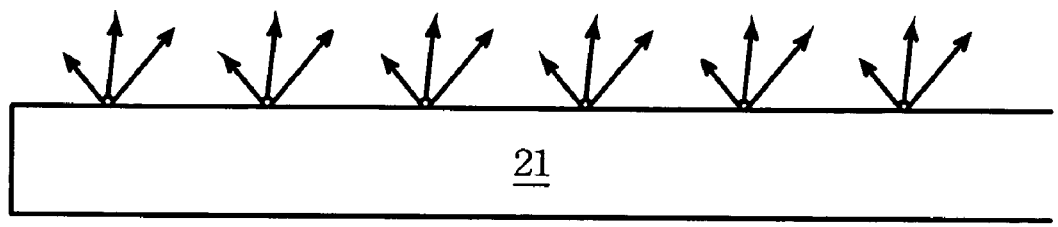
FIG. 3 is a schematic view of light output of a conventional direct backlight module.
Figure 4:
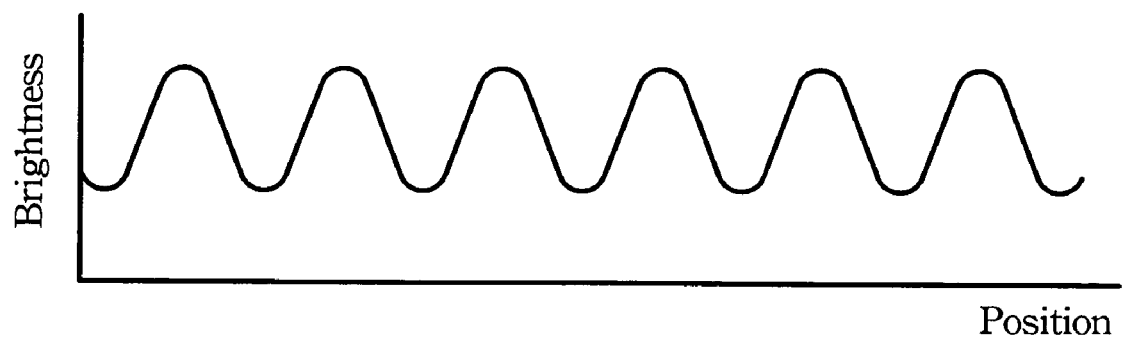
FIG. 4 is a schematic view of brightness distribution of a conventional direct backlight module.
Figure 5:
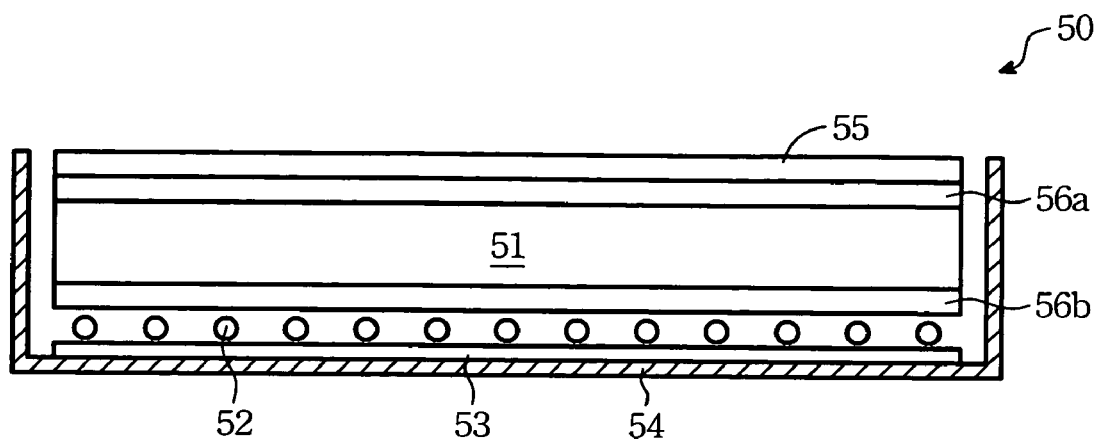
FIG. 5 is a sectional view of the direct backlight module according to the invention.
Figure 6:
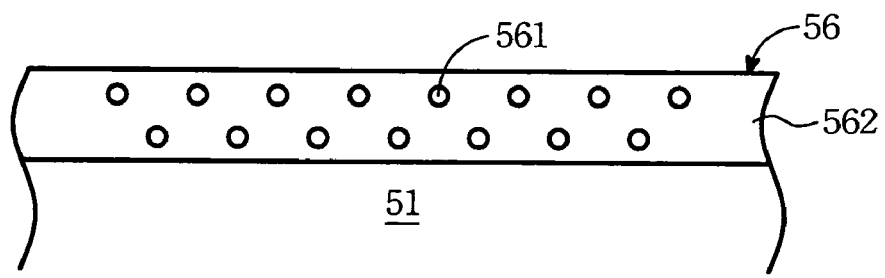
FIG. 6 is a schematic view of the ink layer according to the invention.

Referring to FIG. 5, the direct backlight module 50 according to the invention includes a light guide plate 51, a plurality of lamp tubes 52, a reflecting plate 53, a frame 54, and a plurality of optical films 55. The light guide plate 51 is made from transparent acrylic. The light guide plate includes an upper surface and a lower surface. The upper and lower surfaces are coated with an ink layer 56a and 56b by a screen-printing process. In this embodiment, the ink layers 56a and 56b are formed completely on the upper and lower surfaces of the light guide plate respectively. Each ink layer 56 contains a plurality of diffusion granules 561 and a white fluorescent paint made from triacetate cellulose (TAC) or the like that composes of a transparent resin 562 (referring to FIG. 6). The lamp tubes 52 are distributed below the light guide plate 51 as light sources off the backlight module 50. The reflecting plate 53 is located below the lamp tubes 52. The frame 54 covers the reflecting plate 53, lamp tubes 52, and the lower surface of the light guide plate 51 so as to protect the elements in the backlight module 50 from being damaged by external forces. The optical films 55 are located above the light guide plate 51. Each of the optical films 55 has its specific function to treat lights outputted from the light guide plate 51.

By means of the aforesaid structure, with the ink layer 56 formed on the upper and lower surfaces of the light guide plate 51, the transparent resin 562 contained in the ink layer 56 can absorb and retain incident lights temporarily before emitting. The granules 561 can diffuse a light beam with a greater brightness to several light beams with smaller brightness so that the diffusion effect of the light guide plate 51 is increased and output lights of the light guide plate 51 have higher brightness.

Figure 7:
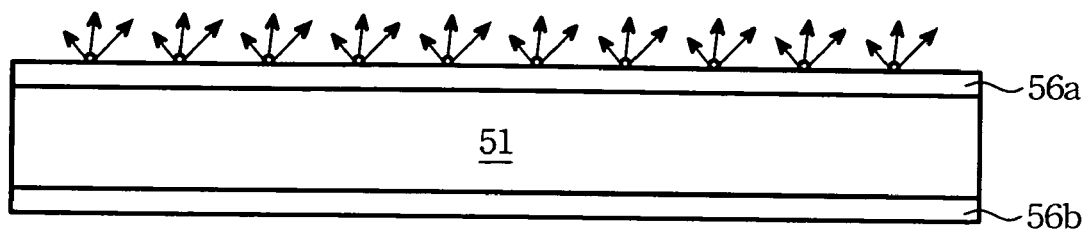
FIG. 7 is a schematic view of light output according to the invention.
Figure 8:
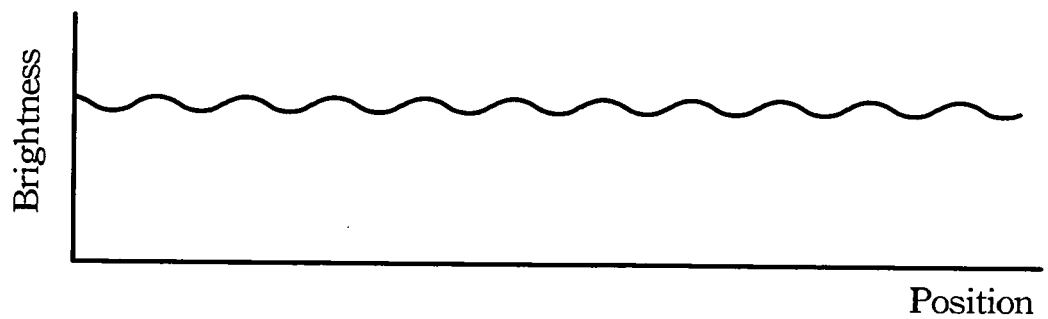
FIG. 8 is a schematic view of brightness distribution according to the invention.

Referring to FIG. 7, due to the ink layers 56, each light beam of a greater brightness will be diffused to a plurality of light beams with a less brightness. Therefore, in the direct backlight module 50, light emitted from the lamp tubes 52, whether enters the light guide plate 51 directly or is reflected by the reflecting plate 53, will be diffused for the first time by the ink layer 56b on the lower surface, then diffused for the second time by the ink layer 56a on the upper surface. After lights have been diffused twice, more uniform lights can be transmitted from the upper surface of the light guide plate 51, so significant brightness variations will not occur to the LCD screen, and visual appealing may be enhanced as shown in FIG. 8.

Comparing FIG. 4 to FIG. 8, the direct backlight module of the invention can generate more uniform lights and reduce brightness variations on the LCD screen. Moreover, one diffusing plate is more expensive than a transparent light guide plate. In the present invention, one transparent light guide plate with at least one ink layer is used to replace the diffusing plate, so the manufacturing cost is reduced. Moreover, the overall brightness of the backlight module also increases.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A direct backlight module, comprising:
   a light guide plate having an upper surface and a lower surface;
   at least two ink layers formed on the upper surface and the lower surface of the light guide plate;
   a plurality of lamp tubes located below the light guide plate to provide light into the light guide plate;
   a reflecting plate located below the lamp tubes for reflecting light into the light guide plate; and
   a frame for holding the reflection plate, the lamp tubes and the light guide plate;
   wherein the ink layers have a plurality of diffusion granules for diffusing light to produce uniform light.

2. The direct backlight module of claim 1, wherein the light guide plate is made from transparent acrylic.

3. The direct backlight module of claim 1, wherein the ink layers are formed on the upper surface and the lower surface of the light guide plate by a screen printing process.

4. The direct backlight module of claim 1, wherein each ink layer comprises a white fluorescent paint.

5. The direct backlight module of claim 1, wherein each ink layer comprises a transparent resin for absorbing and retaining light of the lamp tubes before emitting from the light guide plate.

6. The direct backlight module of claim 1, further comprising a plurality of optical films located above the light guide plate.

7. A direct backlight module, comprising:
   a light guide plate having an upper surface and a lower surface;
   at least one ink layer formed on the upper surface of the light guide plate;
   a plurality of lamp tubes located below the light guide plate to provide light into the light guide plate;
   a reflecting plate located below the lamp tubes for reflecting light to the light guide plate; and
   a frame for holding the reflecting plate, the lamp tubes, and the light guide plate;
   wherein the ink layer has a plurality of diffusion granules for diffusing light to produce uniform light and a transparent resin for absorbing and retaining light of the lamp tubes before emitting from the light guide plate.

8. The direct backlight module of claim 7, wherein the light guide plate is made from transparent acrylic.

9. The direct backlight module of claim 7, wherein the ink layer is formed on the upper surface of the light guide plate by a screen-printing process.

10. The direct backlight module of claim 7, wherein the ink layer comprises a white fluorescent paint.

11. The direct backlight module of claim 7 further including a plurality of optical films located above the ink layer.

12. A direct backlight module, comprising:
- a light guide plate having an upper surface and a lower surface;
- at least one ink layer formed on the upper surface of the light guide plate;
- a plurality of lamp tubes located below the light guide plate to provide light into the light guide plate;
- a reflecting plate located below the lamp tubes for reflecting light to the light guide plate;
- a frame for holding the reflecting plate, the lamp tubes, and the light guide plate; and
- a plurality of optical films located above the ink layer, wherein the ink layer has a plurality of diffusion granules for diffusing light to produce uniform light.

13. The direct backlight module of claim 12, wherein the light guide plate is made from transparent acrylic.

14. The direct backlight module of claim 12, wherein the ink layer is formed on the upper surface of the light guide plate by a screen-printing process.

15. The direct backlight module of claim 12, wherein the ink layer comprises a white fluorescent paint.

16. The direct backlight module of claim 12, wherein the ink layer comprises a transparent resin for absorbing and retaining light of the lamp tubes before emitting from the light guide plate.

* * * * *